United States Patent Office.

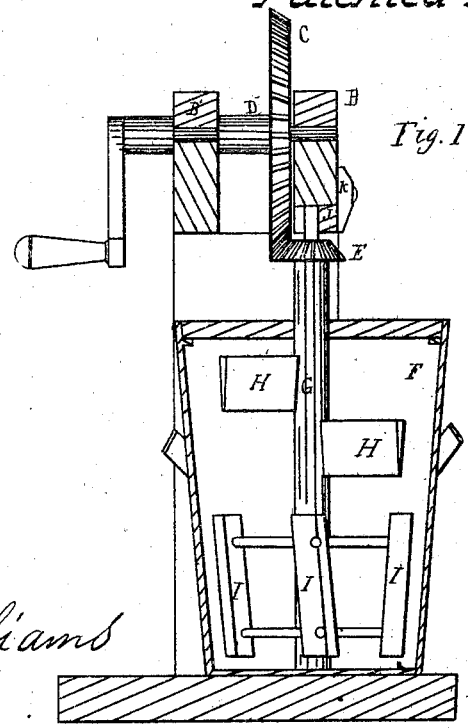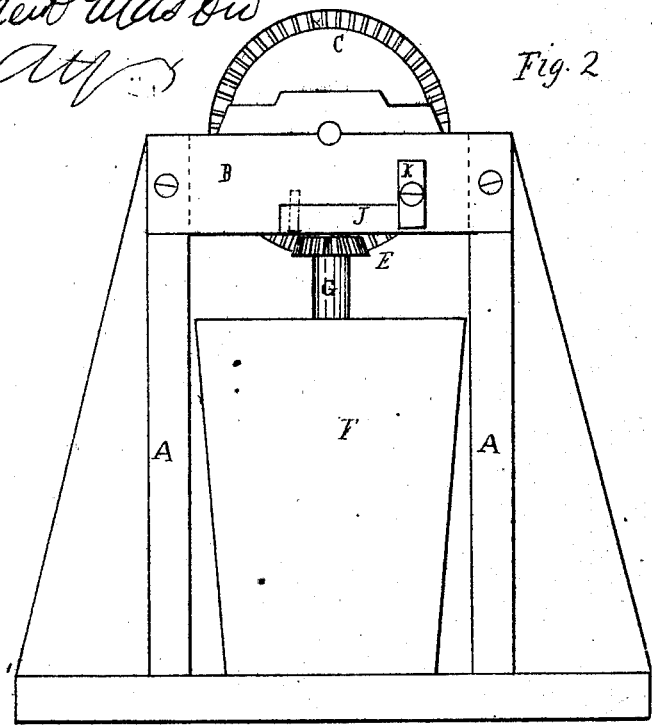

C. B. WILLIAMS, OF BOURBON, INDIANA.

Letters Patent No. 74,467, dated February 11, 1868.

IMPROVEMENT IN CHURNS.

*The Schedule referred to in these Letters Patent and making part of the same.*

TO ALL WHOM IT MAY CONCERN:

Be it known that I, C. B. WILLIAMS, of Bourbon, in the county of Marshall, and in the State of Indiana, have invented certain new and useful Improvements in Churns; and do hereby declare that the following is a full, clear, and exact description thereof, reference being had to the accompanying drawings, and to the letters of reference marked thereon.

In the annexed drawings, making part of this specification, A A represent two uprights, which are secured at their lower ends to a suitable sill, and connected at their upper ends by means of two cross-bars, B B', all being firmly secured together to form a frame for the churn. F represents the churn-body or box. This churn is a four-sided box, which tapers towards its bottom, and is placed upon the sill of the frame beneath the cross-bars B B'. G represents the dasher-staff, which is provided with a series of dashers, I I, which are connected to it by suitable arms. It is also provided with one or more wings, H, which are adjustable upon it to suit the amount of cream in the churn, and which are used more particularly for gathering the butter after it is broken. To the upper end of staff G is secured a bevelled pinion, E. The lower end of this staff has its bearing in the centre and bottom of the churn, while its upper end has its bearing in a hinged block, J. The block J has an opening cut out to receive it, in the bottom of the cross-bar B, and is hinged to said bar at one end of the opening. A button, k, confines it in place when it has been closed up. By means of this hinged block the staff G may be removed or adjusted in working position in a moment. Lying crosswise of the bars B B', and having its bearings in them, is a shaft, D, and upon this shaft is a bevelled gear-wheel, C, which gears into the wheel E on the upper end of the staff. Shaft D is provided with a crank-handle, by means of which motion is communicated to it and to the staff G. The churn-box is made square and tapering, so that it will accommodate a small quantity of cream, and break it better against its square sides.

Having thus fully described my invention, what I claim as new and desire to secure by Letters Patent, is—

The shaft G, with its angular dashers I I and wings H H, adjustable upon the shaft for gathering the butter, when used within the box F as constructed and secured, and operating in the manner and for the purposes set forth.

In testimony that I claim the foregoing, I have hereunto set my hand and seal, this 19th day of August, 1867.

C. B. WILLIAMS. [SEAL.]

Witnesses:
    V. M. WINDBIGLER,
    MARTIN HISSENS.